(12) United States Patent
Clarke

(10) Patent No.: US 7,025,364 B1
(45) Date of Patent: Apr. 11, 2006

(54) COMBINED STROLLER, WALKER AND PLAY STATION

(76) Inventor: William A Clarke, 4549 Budd Dr., Erie, PA (US) 16506

( * ) Notice: Subject to any disclaimer, the term of this patent is extended or adjusted under 35 U.S.C. 154(b) by 0 days.

(21) Appl. No.: 10/744,519

(22) Filed: Dec. 23, 2003

(51) Int. Cl.
B62B 7/14 (2006.01)

(52) U.S. Cl. .............................. 280/87.051; 280/47.38; 297/5; 297/137

(58) Field of Classification Search .......... 280/87.051, 280/87.021, 47.34, 47.38, 47.39, 47.4, 47.41; 297/5, 137; 482/66, 68, 69
See application file for complete search history.

(56) References Cited

U.S. PATENT DOCUMENTS

| | | | | |
|---|---|---|---|---|
| 1,793,848 A * | 2/1931 | Gill et al. ...................... | 280/7.1 |
| 2,198,813 A * | 4/1940 | Hall ............................ | 280/7.1 |
| 2,415,146 A * | 2/1947 | Nanna ......................... | 280/7.1 |
| 2,606,593 A * | 8/1952 | Beurskens ................... | 280/7.1 |
| 2,665,742 A * | 1/1954 | Starysky ...................... | 280/7.1 |
| 2,910,111 A * | 10/1959 | Hausburg .................... | 297/137 |
| 3,272,530 A * | 9/1966 | Klassen ...................... | 280/79.2 |
| 3,504,927 A * | 4/1970 | Seki .......................... | 280/87.05 |
| 3,796,430 A * | 3/1974 | Sudo .......................... | 280/87.05 |
| 4,503,943 A * | 3/1985 | Tsukui ........................... | 188/5 |
| 4,618,033 A * | 10/1986 | Kassai .......................... | 188/20 |
| 4,776,415 A | 10/1988 | Brice .......................... | 180/11 |
| 5,080,383 A * | 1/1992 | Hsieh ....................... | 280/87.051 |
| 5,201,535 A | 4/1993 | Kato et al. ..................... | 280/30 |
| 5,230,523 A | 7/1993 | Wilhelm ....................... | 280/30 |
| 5,302,163 A * | 4/1994 | Fermaglich et al. .......... | 482/66 |
| 5,342,072 A | 8/1994 | Prasad .................... | 280/87.051 |
| 5,366,231 A * | 11/1994 | Hung .................... | 280/87.051 |
| 5,382,033 A * | 1/1995 | Cheu ....................... | 280/87.051 |
| 5,407,246 A * | 4/1995 | Meeker et al. ............... | 297/137 |
| 5,451,093 A | 9/1995 | Petrie et al. ................. | 297/137 |
| 5,480,210 A * | 1/1996 | Lehenbauer et al. ........ | 297/137 |
| 5,518,475 A * | 5/1996 | Garland ....................... | 482/68 |
| 5,522,782 A * | 6/1996 | Kurtin et al. ................. | 482/66 |
| 5,564,724 A * | 10/1996 | Huang .................... | 280/87.051 |
| 5,590,892 A * | 1/1997 | Hu ........................ | 280/87.051 |
| 5,688,211 A * | 11/1997 | Myers ......................... | 482/66 |
| 5,728,030 A * | 3/1998 | Hsieh .......................... | 482/66 |
| 5,988,670 A | 11/1999 | Song et al. .................. | 280/648 |
| 6,012,731 A * | 1/2000 | Liu ....................... | 280/87.051 |
| 6,048,290 A * | 4/2000 | Chen et al. .................... | 482/68 |
| 6,056,306 A * | 5/2000 | Rust et al. .................. | 280/204 |
| 6,139,046 A | 10/2000 | Aalund et al. ............. | 280/642 |
| 6,152,477 A * | 11/2000 | Hsin et al. .................. | 280/642 |
| 6,179,376 B1 * | 1/2001 | Meeker et al. .............. | 297/137 |
| 6,231,056 B1 | 5/2001 | Wu ........................... | 280/7.17 |
| 6,332,240 B1 | 12/2001 | Wu .......................... | 16/18 CG |
| 6,386,563 B1 * | 5/2002 | Chen et al. ............ | 280/87.051 |
| 2004/0075231 A1 * | 4/2004 | Hou et al. ............. | 280/87.051 |

* cited by examiner

*Primary Examiner*—Jeff Restifo
(74) *Attorney, Agent, or Firm*—Richard K Thomson

(57) ABSTRACT

A stroller has a pivotable seat which may be latched at any rotational angle desired. In addition, a support tray positioned beneath the seat can be folded into a stored position and the height of the support platform adjusted to accommodate the height of the baby occupying the seat, which permits the stroller to be used as a walker and as a play station.

19 Claims, 2 Drawing Sheets

COMBINED STROLLER, WALKER AND PLAY STATION

BACKGROUND AND SUMMARY OF THE INVENTION

The present invention is directed to an improved infant care device. More particularly, the present invention is directed to an improved stroller which permits a baby to be positioned to face any direction and may be converted to function as a walker and/or a play station.

Assembling all the needed items for taking a family trip, when the family includes one or more babies/toddlers, is no small task. The growth in popularity of minivans is due, at least in part, to the need for adequate storage space to transport these items. The needed items include a stroller, a walker, and a play station, not to mention the diapers, clothes, formula/food and a vast assortment of additional paraphernalia, which often discourages families with small children from traveling at all.

In addition, although strollers are the number one selling baby item, there has been very little new and exciting implemented recently. Most strollers lack versatility. For example, the seat or carriage is locked to require the infant to sit either face forward or rearward, with a few carriages having sun shield which flips back and forth to permit the baby to face either direction.

It is among the intentions of the present invention to provide a stroller which enables the seat for the baby to be locked in any desired orientation throughout a 360° span. In addition, the present device combines the features of a stroller, walker and a play station into a single unit eliminating the cost associated with buying three separate items and the hassle of finding space to store/transport them.

The device of the present invention comprises a combined baby stroller and toddler walker including a) a wheeled carriage having i) a handle to permit said combined baby stroller and toddler walker to be pushed in a desired direction, ii) a plurality of wheel elements supporting said wheeled carriage; b) a seat for receiving a child; c) means for mounting said seat on said wheeled carriage which permits a height said seat is positioned above said wheeled carriage to be varied; d) means for locking at least one of said plurality of wheel elements; whereby said seat may be lowered to a position where the toddler's feet engage the ground and, with said locking means engaged, the toddler may safely move in a circle about said locked wheel.

The combined baby stroller includes means to permit said seat to be rotated through 360° about a vertical axis and locking means to lock said seat in any desired position. In addition, the device comprises a play station surrounding said seat. The locking means can be disengaged to permit said toddler to rotate freely about said vertical axis. The locking means on both rear wheels we be engaged when the combined baby stroller is functioning in the play station mode.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
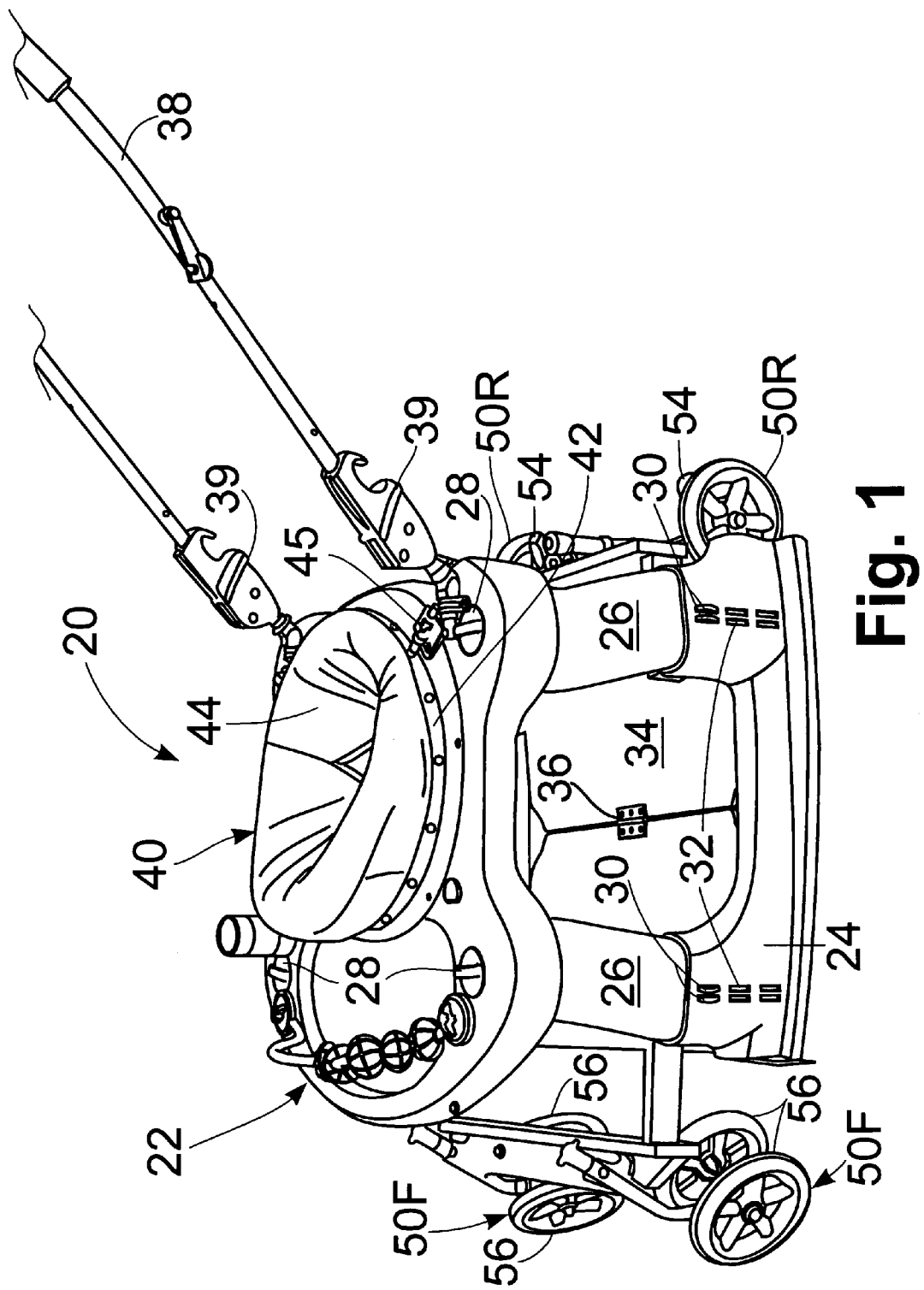
FIG. 1 is a perspective view of a first embodiment of the stroller of the present invention configured to function as a stroller.
Figure 2:
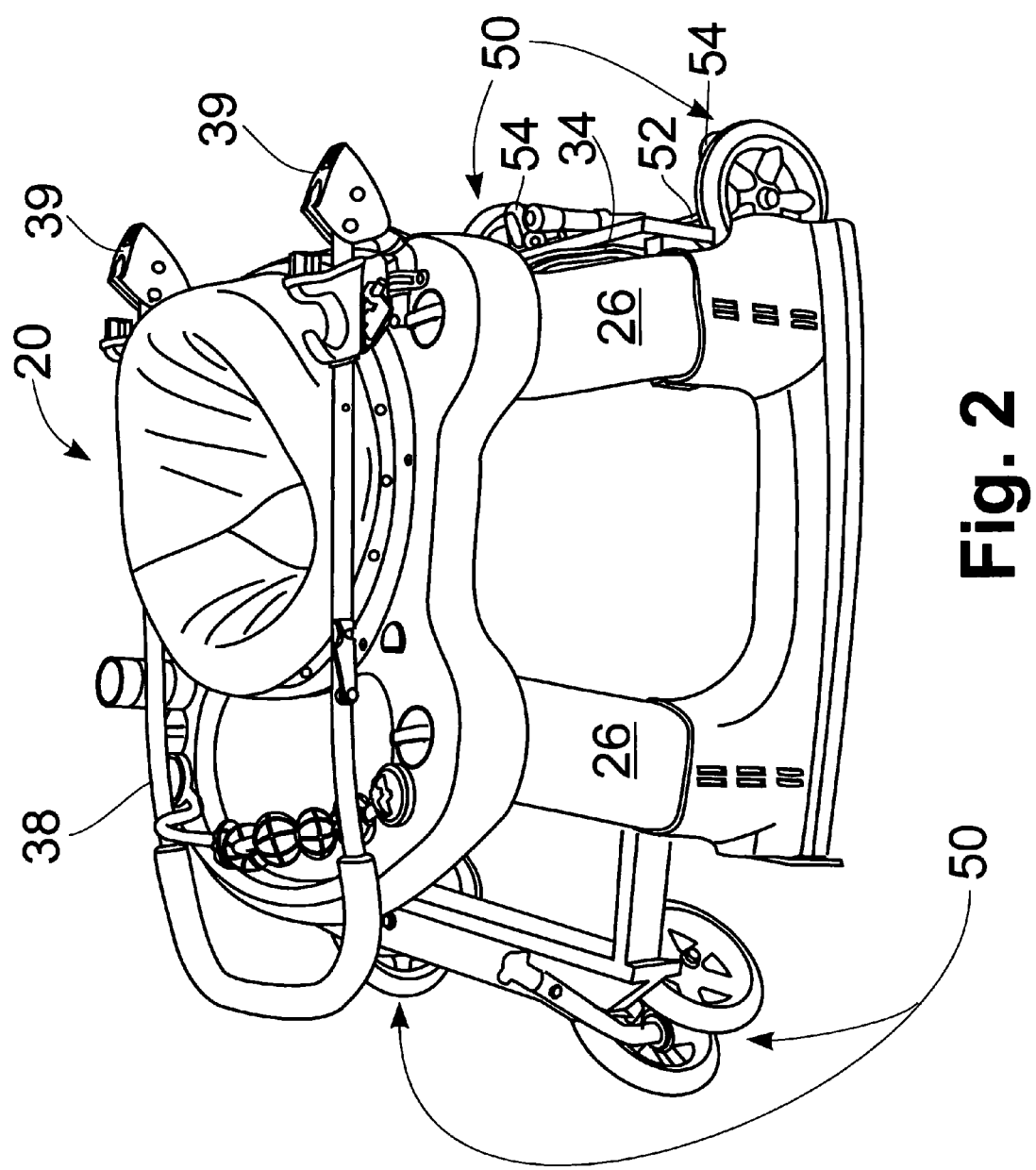
FIG. 2 is a perspective view of the first embodiment configured to function as a walker/play station.

The first embodiment of the stroller of the present invention is depicted in FIGS. 1–2 generally at 20. Stroller 20 includes a support platform 22, supported on base 24 by four legs 26. Legs 26 can be adjusted vertically relative to base 24 by rotating latch releases 28 to retract the latches 30 from engagement with one set of openings 32 permitting movement to another set which is higher or lower. Typically, when operating the device in the stroller mode, legs 26 will be positioned at maximum height (as depicted in FIG. 1) to provide clearance for the baby's legs and maximize available storage room on tray 34. Tray 34 is hinged at 36 and adjacent one end to permit the tray 34 to be folded back out of the way for operation of stroller 20 in the walker/play station mode (FIG. 2). Handle 38 is attached to the support platform 22 and is raised and lowered therewith as legs 26 are adjusted.

Seat 40 is mounted in support platform 22 so that it may be rotated and latched in any position throughout a 360° span. Seat 40 comprises a rigid plastic shell 42 to which a plasticized fabric 44 is attached over padding. As depicted in FIG. 1, the latching means 45 comprises a slide lock similar to those used on gates, etc., which engages in any of a plurality of apertures in rigid plastic shell 42. It is envisioned that an alternative means of latching could take the form of a gear attached to the periphery of shell 42 with which a pair of spring-biased gear segments engage to lock the seat in any position desired.

Base 24 has at least three and, preferably, four sets of wheels 50 (FIG. 2). The rear wheels 50R are mounted on axle 52 and each equipped with a locking means (or mechanism) 54. The front wheels 50F are preferably paired sets of casters 56 which can rotate about a vertical axis to facilitate steering the stroller 20 by handle 38. Normally, in the stroller mode (FIG. 1), the tray 34 will be down and the locking means 54 unlocked. Locking means 54 can/should be engaged when the parent stops to chat with a neighbor and show off the baby. In this mode, the seat 40 can be locked by latching means 45 in any position throughout the 360° panorama. As an alternative and demonstrating the flexibility of the stroller of this invention, the seat 40 can be locked facing forward, the tray 34 put in the retracted mode (stored behind seat 40), the height of the support platform 22 adjusted to enable the baby's feet to engage the ground and stroller 20 can be used as a "steerable walker" strengthening baby's legs during a stroll.

To convert the stroller 20 to the walker mode, normally the handle 38 is unlatched at joint 39 by pulling upward and folded forward (FIG. 2) and seat 40 locked in the directed forward position (FIG. 2). This is also the collapsed store/transport position to reduce the profile of stroller 20. One locking means 54 will be engaged with its respective wheel 50R which will, then, serve as the pivot axis for stroller/walker 20. With the one wheel 50R locked, the parent or care giver can safely leave the child to get her/his exercise without fear s/he will wander into an unsafe area.

Finally, to use the stroller 20 as a play station, both locking means 54 will be engaged and the seat latching means 45 left disengaged. Handle 38 may be left up or folded down, at the option of the care giver. The baby may then play with the items which are on the front and sides of the stroller platform 22 or other items placed thereon and can turn seat 40 fully about its 360° range of motion without the base 24 moving.

Stroller 20 has enormous versatility, incorporating features of a stroller, a walker and a play station while affording options which are not typically available with any of those items (i.e., the steerable walker). With a single device capable of performing the function of all three, the owner has significantly less expense and need only find storage/transport space for a single item.

Various changes, alternatives and modifications will become apparent to one of ordinary skill in the art following a reading of the foregoing specification. For example, although no awning or sun cover has been shown to more clearly depict the inventive features of Applicant's combination stroller, any commercially available awning can be used. It is intended that any such changes, alternatives and modifications as fall within the scope of the appended claims be considered part of the present invention.

I claim:

1. A baby stroller comprising
   a) a wheeled carriage having a separate handle to permit said baby stroller to be pushed in a desired direction;
   b) a seat for receiving an infant;
   c) means for mounting said seat on said wheeled carriage permitting rotation of said seat throughout 360° about a vertical axis;
   d) first latching means locking said seat in any of a plurality of desired positions throughout said 360° rotation;
   e) second latching means securing a first portion of said handle to a second portion of said handle, said second latching means permitting said first portion of said handle to pivot between a first position in which said first portion of said handle is locked relative to said second portion so as to extend above a maximum height of said seat and a second position in which said first portion of said handle is collapsed below said maximum height of said seat;
   f) a removable tray positioned on said wheeled carriage beneath said seat portion said removable tray being foldable to a stored position beneath said seat portion permitting the infant to use the stroller as a walker;
   whereby the infant may be positioned facing forward, rearward or any direction there between.

2. The baby stroller of claim 1 wherein said wheeled carriage has at least three sets of wheels, each set of wheels mounted on an axle to permit rotation about a horizontal axis.

3. The baby stroller of claim 2 wherein said wheeled carriage has four sets of wheels.

4. The baby stroller of claim 3 wherein each of a front pair of said four sets of wheels comprises a tandem pair of wheels, said tandem pair of wheels being mounted to pivot about a vertical axis.

5. The baby stroller of claim 4 wherein at least one of a rear pair of wheels has a lock thereon preventing rotation about its horizontal axis.

6. The baby stroller of claim 5 wherein each of said rear pair of wheels has a lock thereon to prevent rotation about its horizontal axis.

7. The baby stroller of claim 1 further comprising a play station surrounding said seat providing the infant with various activities.

8. The baby stroller of claim 1 further comprising hinge means permitting said stroller to collapse into a flatter, more easily transportable configuration.

9. A combined baby stroller and toddler walker comprising
   a) a wheeled carriage including
      i) a separate handle to permit said combined baby stroller and toddler walker to be pushed in a desired direction,
      ii) a plurality of wheel elements supporting said wheeled carriage;
   b) a seat for receiving a child;
   c) means for mounting said seat on said wheeled carriage which permits a height said seat is positioned above said wheeled carriage to be varied;
   d) means for locking at least one of said plurality of wheeled elements while permitting said remaining wheeled elements to function normally;
   e) latching means securing a first portion of said handle to a second portion of said handle, said latching means permitting said first portion of said handle to pivot between a first position in which said first portion of said handle is locked relative to said second portion so as to extend above a maximum height of said seat and a second position in which said first portion of said handle is collapsed below said maximum height of said seat;
   f) a removable tray positioned on said wheeled carriage beneath said seat portion said removable tray being foldable to a stored position beneath said seat portion permitting the infant to use the stroller as a walker;
   whereby said seat may be lowered to a position where the toddler's feet engage the ground and, with said locking means engaged, the toddler may safely move in a circle about said locked wheel.

10. The combined baby stroller and toddler walker of claim 9 wherein said means for mounting said seat further comprises means to permit said seat to be rotated through 360° about a vertical axis and latching means to lock said seat in any desired position.

11. The combined baby stroller and toddler walker of claim 10 wherein said latching means can be disengaged to permit said toddler to rotate freely about said vertical axis.

12. The combined baby stroller and toddler walker of claim 9 further comprising a play station surrounding said seat.

13. A combined baby stroller, toddler walker and play station comprising
   a) a wheeled carriage including
      i) a base;
      ii) a separate handle attached to said base to permit said combined baby stroller, toddler walker and play station to be pushed in a desired direction,
      ii) a plurality of wheel elements supporting said base;
   b) a seat positioned above said base for receiving a child;
   c) means for mounting said seat on said base permitting rotation of said seat throughout 360° about a vertical axis;
   d) latching means for locking said seat in any position throughout said 360°;
   e) means for locking at least two of said plurality of wheeled elements;
   f) a play station surrounding said seat;
   g) a hinged tray mounted on said base beneath said seat, said hinged tray being pivotable between a first position extending beneath said seat and a stored position behind said seats;

whereby said combined stroller, toddler walker and play station has a stroller mode of operation, a walker mode of operation and a play station mode of operation, and in said stroller mode said latching means is engaged to lock said seat in any position throughout said 360° rotation with said means for locking said wheel elements being disengaged, in said walker mode, said latching means is locked with said seat in a face forward position and at least one of said means for locking said wheel elements is optionally engaged, and in a play station mode said latching means for said seat is disengaged and each of said at least two means for locking said wheel elements is engaged.

14. The combined baby stroller, toddler walker and play station of claim 13 wherein said wheeled carriage has at least three sets of wheels, each set of wheels mounted on an axle to permit rotation about a horizontal axis.

15. The combined baby stroller, toddler walker and play station of claim 14 wherein said wheeled carriage has four sets of wheels.

16. The combined baby stroller, toddler walker and play station of claim 15 wherein each of a front pair of said four sets of wheels comprises a tandem pair of wheels, said tandem pair of wheels being mounted to pivot about a vertical axis.

17. The combined baby stroller, toddler walker and play station of claim 16 wherein at least one of a rear pair of wheels has a lock thereon preventing rotation about its horizontal axis.

18. The combined baby stroller, toddler walker and play station of claim 17 wherein each of said rear pair of wheels has a lock thereon to prevent rotation about its horizontal axis.

19. The combined baby stroller, toddler walker and play station of claim 13 further comprising hinge means permitting said stroller to collapse into a flatter, more easily transportable configuration.

* * * * *